United States Patent
Chen et al.

(10) Patent No.: US 7,545,471 B2
(45) Date of Patent: Jun. 9, 2009

(54) LCD HAVING ALTERNATING COMMON AND PIXEL ELECTRODES WITH RESPECTIVE TRANSPARENT CONDUCTIVE FILMS THEREON AND ARRANGED ON A GLASS SUBSTRATE SEPARATED BY AN INTERVENING INSULATING LAYER YET EQUIDISTANT FROM THE LIQUID CRYSTAL LAYER FOR THE DISPLAY

(75) Inventors: Chueh-Ju Chen, Miao-Li (TW); Jia-Pang Pang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 439 days.

(21) Appl. No.: 11/317,114

(22) Filed: Dec. 23, 2005

(65) Prior Publication Data
US 2006/0146258 A1 Jul. 6, 2006

(30) Foreign Application Priority Data
Dec. 30, 2004 (CN) .......................... 2004 1 0091964

(51) Int. Cl.
*G02F 1/1343* (2006.01)

(52) U.S. Cl. ...................................... 349/141; 349/147

(58) Field of Classification Search ................. 349/141, 349/147
See application file for complete search history.

(56) References Cited

U.S. PATENT DOCUMENTS

| 4,876,165 | A | 10/1989 | Brewer et al. |
| 5,084,778 | A | 1/1992 | DeJule et al. |
| 5,907,379 | A * | 5/1999 | Kim et al. .................... 349/141 |
| 6,885,424 | B2 | 4/2005 | Yoo |
| 7,190,429 | B2 * | 3/2007 | Yoshida et al. .............. 349/141 |

* cited by examiner

*Primary Examiner*—David Nelms
*Assistant Examiner*—John Heyman
(74) *Attorney, Agent, or Firm*—Wei Te Chung

(57) ABSTRACT

An exemplary liquid crystal display includes a first glass layer (210) and a second glass layer (220) opposite to each other, a liquid crystal layer (27) interposed between the first and second glass layers, at least one alignment layer (224 and/or 414) disposed between the first and second glass layers, a plurality of common electrodes (225) arranged on the second glass layer, an insulation layer (227) arranged on the second glass layer, a plurality of pixel electrodes (226) arranged on the insulation layer, a first transparent conductive film (250) arranged on each of the common electrodes, and a second transparent conductive film (260) arranged on each of the pixel electrodes. A distance separating the common electrodes and the liquid crystal layer is equal to that separating the pixel electrodes and the liquid crystal layer. The liquid crystal display can avoid the occurrence of image delay.

16 Claims, 3 Drawing Sheets

LCD HAVING ALTERNATING COMMON AND PIXEL ELECTRODES WITH RESPECTIVE TRANSPARENT CONDUCTIVE FILMS THEREON AND ARRANGED ON A GLASS SUBSTRATE SEPARATED BY AN INTERVENING INSULATING LAYER YET EQUIDISTANT FROM THE LIQUID CRYSTAL LAYER FOR THE DISPLAY

FIELD OF THE INVENTION

The present invention relates to liquid crystal displays (LCDs), and more particularly to an in-plane switching (IPS) liquid crystal display.

BACKGROUND

Recently, LCDs that are light and thin and have low power consumption characteristics have been widely used in office automation equipment, video recording and playing units, and the like. Such kinds of LCDs typically include a twisted nematic (TN) mode LCD and a super twisted nematic (STN) mode LCD. Although TN-LCDs and STN-LCDs have been put to practical use in many applications, they generally have a very narrow viewing angle. In order to solve the problem of a narrow viewing angle, IPS LCDs have been developed.

A conventional IPS LCD is shown in FIG. 4. The IPS LCD 1 includes a first substrate 11, a second substrate 12 opposite to the first substrate 11, and a liquid crystal layer 17 sandwiched between the first substrate 11 and the second substrate 12. The first substrate 11 includes a first polarizer 112, a first glass layer 110, a color filter 113, and a first alignment layer 114 arranged in that order from top to bottom. The second substrate 12 includes a second polarizer 122, a second glass layer 120, an insulation layer 127, a passivation layer 121, and a second alignment layer 124 arranged in that order from bottom to top.

A plurality of common electrodes 125 are arranged on the second glass layer 120, the common electrodes 125 being covered by the insulation layer 127. A plurality of pixel electrodes 126 are arranged on the insulation layer 127, the pixel electrodes 125 being covered by the passivation layer 121. The common and pixel electrodes 125, 126 are formed at staggered intervals. The liquid crystal layer 17 includes a plurality of liquid crystal molecules 170 that constitute positive liquid crystal. The first and second alignment layers 114, 124 are adjacent the liquid crystal layer 17, and are used for controlling the orientation of the liquid crystal molecules 170. The first and second glass layers 110, 120 are made of transparent glass material.

Referring also to FIG. 5, when a voltage is applied, the common electrodes 125 and the pixel electrodes 126 generate an electric field 18 parallel to the first and second substrates 11, 12. Because the liquid crystal molecules 170 are positive liquid crystal, the orientation of the liquid crystal molecules 170 is the same as the direction of the electric field 18. Further, in general, the liquid crystal layer 17 can absorb charged particles from its environment. Thus when the voltage is applied, the common electrodes 125 exert a first force on the charged particles in the liquid crystal layer 17 and thereby gather the charged particles, and the pixel electrodes 126 exert a second force on the charged particles in the liquid crystal layer 17 and thereby gather the charged particles.

The insulation layer 127, the passivation layer 121 and the second alignment layer 124 are located between the common electrodes 125 and the liquid crystal layer 17. The passivation layer 121 and the second alignment layer 124 are located between the pixel electrodes 126 and the liquid crystal layer 17. Therefore, the distance between the common electrodes 125 and the liquid crystal layer 17 is different from the distance between the pixel electrodes 126 and the liquid crystal layer 17. Consequently, the first force exerted on the charged particles by the common electrodes 125 is different from the second force exerted on the charged particles by the pixel electrodes 126.

Because polarities of the common electrodes 125 and the pixel electrodes 126 are always changed during the course of driving the IPS LCD 1, the number of charged particles aggregated at the common electrodes 125 and the number of the charged particles aggregated at the pixel electrodes 125 are different. Therefore, the intensity of the electric field 18 is weakened. The number of liquid crystal molecules 170 that are twisted is decreased, and the speed at which the liquid crystal molecules 170 are twisted is decreased. That is, an image delay occurs in the IPS LCD 1. Therefore the display of the IPS LCD 1 is not clear.

What is needed, therefore, is a liquid crystal display which can avoid image delay occurring and which has a clear display.

SUMMARY

In a first preferred embodiment, a liquid crystal display includes a first glass layer and a second glass layer opposite to each other, a liquid crystal layer interposed between the first and second glass layers, at least one alignment layer disposed between the first and second glass layers, a plurality of common electrodes arranged on the second glass layer, an insulation layer arranged on the second glass layer, a plurality of pixel electrodes arranged on the insulation layer, a first transparent conductive film arranged on each of the common electrodes, and a second transparent conductive film arranged on each of the pixel electrodes. A distance separating the common electrodes and the liquid crystal layer is equal to that separating the pixel electrodes and the liquid crystal layer.

In a second preferred embodiment, a liquid crystal display includes a first glass layer and a second glass layer opposite to each other, a liquid crystal layer interposed between the first and second glass layers, at least one alignment layer disposed between the first and second glass layers, a plurality of pixel electrodes arranged on the second glass layer, an insulation layer arranged on the second glass layer, a plurality of common electrodes arranged on the insulation layer, a first transparent conductive film arranged on each of the common electrodes, and a second transparent conductive film arranged on each of the pixel electrodes. A distance separating the common electrodes and the liquid crystal layer is equal to that separating the pixel electrodes and the liquid crystal layer.

In a third preferred embodiment, a liquid crystal display includes a first substrate, a second substrate opposite to the first substrate, and a liquid crystal layer disposed between the two substrates. The first substrate includes a first glass layer and a first alignment layer. The second substrate includes a second glass layer, a plurality of common electrodes arranged on the second glass layer, an insulation layer arranged on the second glass layer, a plurality of pixel electrodes arranged on the insulation layer, a passivation layer formed on portions of the insulation layer surrounding the pixel electrodes, a first transparent conductive film arranged on each of the common electrodes and surrounding portions of the insulation layer and passivation layer, and a second transparent conductive film arranged on each of the pixel electrodes and surrounding portions of the passivation layer. A distance separating the common electrodes and the liquid crystal layer is equal to that separating the pixel electrodes and the liquid crystal layer.

In each of the liquid crystal displays of the above-described preferred embodiments, the distance separating the common electrodes and the liquid crystal layer is equal to the distance separating the pixel electrodes and the liquid crystal layer. Therefore, when there are charged particles in the liquid crystal layer, the common electrodes exert a force on the charged particles which is the same as a force exerted on the charged particles by the pixel electrodes. Further, because polarities of the common electrodes and the pixel electrodes are always changed during the course of driving the liquid crystal display, the charged particles do not concentrate at either the common electrodes or the pixel electrodes. Therefore, the liquid crystal display can avoid image delay occurring. Moreover, because the first transparent conductive film is arranged on each of the common electrodes and the second transparent conductive film is arranged on each of the pixel electrodes, the common electrodes and the pixel electrodes can be protected by the transparent conductive films from interference by other electronic elements.

Further, in the third preferred embodiment, the first transparent conductive film is arranged directly on each of the common electrodes and surrounding portions of the insulation layer and passivation layer, and the second transparent conductive film is arranged directly on each of the pixel electrodes and surrounding portions of the passivation layer. When a voltage is applied, an electric field produced by the first and second conductive films is the same as the electric field produced by the common and pixel electrodes. Further, because an area of the first transparent conductive film is larger than that of the common electrodes, and an area of the second transparent conductive film is larger than that of the pixel electrodes, the electric field applied to the liquid crystal layer is increased. Therefore, the liquid crystal display of the third preferred embodiment has a better image display compared to a conventional IPS LCD.

Other advantages and novel features will become more apparent from the following detailed description when taken in conjunction with the accompanying drawings, in which:

DETAILED DESCRIPTION OF PREFERRED EMBODIMENTS

Figure 1:
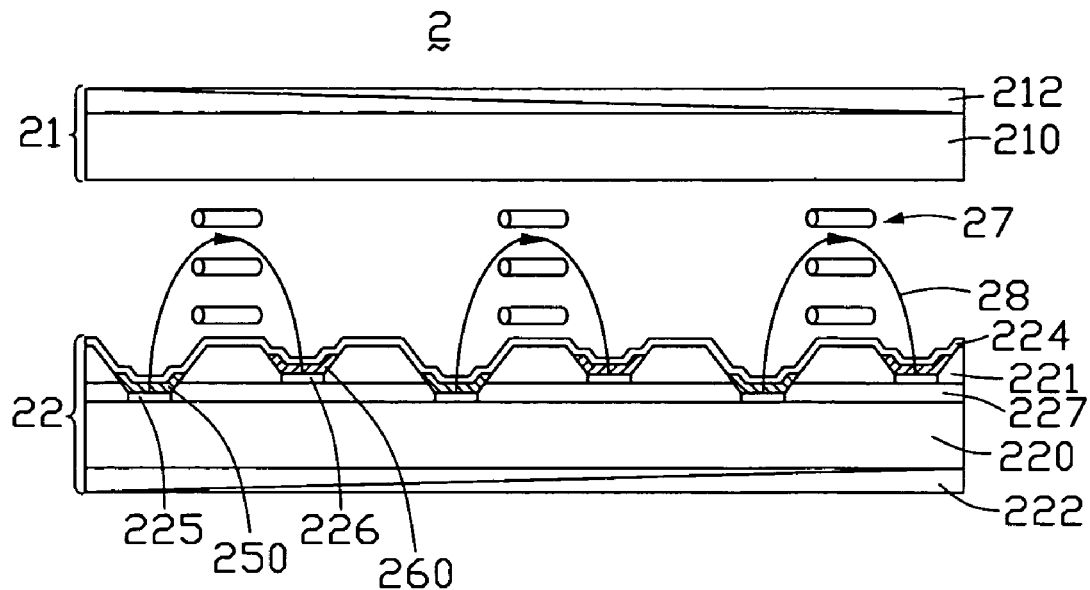
FIG. 1 is a schematic, side cross-sectional view of part of an IPS LCD according to a first preferred embodiment of the present invention, showing the IPS LCD in an operational state in which a voltage is applied.

Referring to FIG. 1, an IPS LCD 2 according to a first preferred embodiment of the present invention includes a first substrate 21, a second substrate 22 opposite to the first substrate 21, and a liquid crystal layer 27 interposed between the first and second substrates 21, 22. The first substrate 21 includes a first glass layer 210 adjacent the liquid crystal layer 27, and a first polarizer 212.

The second substrate 22 includes a second glass layer 220, an insulation layer 227 arranged at an inner side of the second glass layer 220, a second polarizer 222 arranged at an outer side of the second glass layer 220, a plurality of common electrodes 225 formed on the second glass layer 220, a plurality of pixel electrodes 226 formed on the insulation layer 227, a passivation layer 221 arranged on portions of the insulation layer 227 surrounding the pixel electrodes 226, a first transparent conductive film 250 directly deposited on each of the common electrodes 225, a second transparent conductive film 260 directly deposited on each of the pixel electrodes 226, and an alignment layer 224 formed on the first and second transparent conductive films 250, 260 and the passivation layer 221. The insulation layer 227 is positioned between the common electrodes 225. The passivation layer 221 is positioned generally between the pixel electrodes 226. The common electrodes 225 and the pixel electrodes 226 are formed at regular, staggered intervals. A thickness of the first transparent conductive film 250 is the same as that of the second transparent conductive film 260.

As shown in FIG. 1, when a voltage is applied, the common and pixel electrodes 225, 226 generate an electric field 28 parallel to the first and second glass layers 210, 220. A distance separating the common electrodes 225 and the liquid crystal layer 27 is the same as a combined thickness of the alignment layer 224 and the first transparent conductive film 250. Similarly, a distance separating the pixel electrodes 226 and the liquid crystal layer 27 is the same as a combined thickness of the alignment layer 224 and the second transparent conductive film 260. That is, the distance separating the common electrodes 225 and the liquid crystal layer 27 is equal to the distance separating the pixel electrodes 226 and the liquid crystal layer 27.

Therefore, when there are charged particles in the liquid crystal layer 27, the common electrodes 225 exert a force on the charged particles which is the same as a force exerted on the charged particles by the pixel electrodes 226. Further, because polarities of the common electrodes 225 and the pixel electrodes 226 are always changed during the course of driving the IPS LCD 2, the charged particles do not concentrate at either the common electrodes 225 or the pixel electrodes 226. That is, the IPS LCD 2 can avoid image delay occurring. Moreover, because the first transparent conductive film 250 is deposited on each of the common electrodes 225, and the second transparent conductive film 260 is deposited on each of the pixel electrodes 226, the first transparent conductive film 250 can protect the common electrodes 225 from interference by other electronic elements, and the second transparent conductive film 260 can protect the pixel electrodes 226 from interference by other electronic elements.

Figure 2:
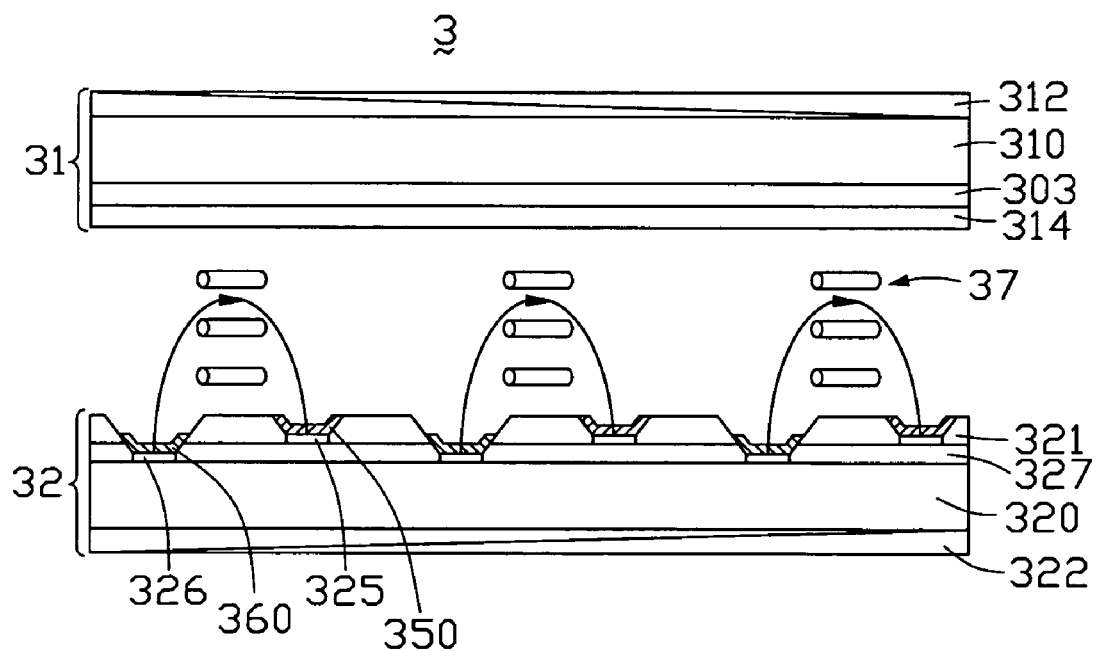
FIG. 2 is a schematic, side cross-sectional view of part of an IPS LCD according to a second preferred embodiment of the present invention, showing the IPS LCD in an operational state in which a voltage is applied.

Referring to FIG. 2, an IPS LCD 3 according to a second preferred embodiment of the present invention includes a first substrate 31, a second substrate 32 opposite to the first substrate 31, and a liquid crystal layer 37 interposed between the first and second substrates 31, 32. The first substrate 31 includes a first polarizer 312, a first glass layer 310, a color filter 313, and an alignment layer 314 arranged in that order from top to bottom.

The second substrate 32 includes a second glass layer 320, an insulation layer 327 arranged at an inner side of the second glass layer 320, a second polarizer 322 arranged at an outer side of the second glass layer 320, a plurality of pixel electrodes 326 formed on the second glass layer 320, a plurality of common electrodes 325 formed on the insulation layer 327, a passivation layer 321 arranged on portions of the insulation layer 327 surrounding the common electrodes 325, a first transparent conductive film 350 directly deposited on each of the common electrodes 325, and a second transparent conductive film 360 directly deposited on each of the pixel electrodes 326. The insulation layer 327 is positioned between the pixel electrodes 326. The passivation layer 321 is positioned generally between the common electrodes 325. The common electrodes 325 and the pixel electrodes 326 are formed at regular, staggered intervals. A thickness of the first transparent conductive film 350 is the same as that of the second transparent conductive film 360.

As shown in FIG. 2, a distance separating the common electrodes 325 and the liquid crystal layer 37 is the same as the thickness of the first transparent conductive film 350. Similarly, a distance separating the pixel electrodes 326 and the liquid crystal layer 37 is the same as the thickness of the second transparent conductive film 360. That is, the distance separating the common electrodes 325 and the liquid crystal layer 37 is equal to the distance separating the pixel electrodes 326 and the liquid crystal layer 37. Therefore, when there are charged particles in the liquid crystal layer 37, the common electrodes 325 exert a force on the charged particles which is the same as a force exerted on the charged particles by the pixel electrodes 326. Further, because polarities of the common electrodes 325 and the pixel electrodes 326 are always changed during the course of driving the IPS LCD 3, the charged particles do not concentrate at either the common electrodes 325 or the pixel electrodes 326. That is, the IPS LCD 3 can avoid image delay occurring.

Figure 3:
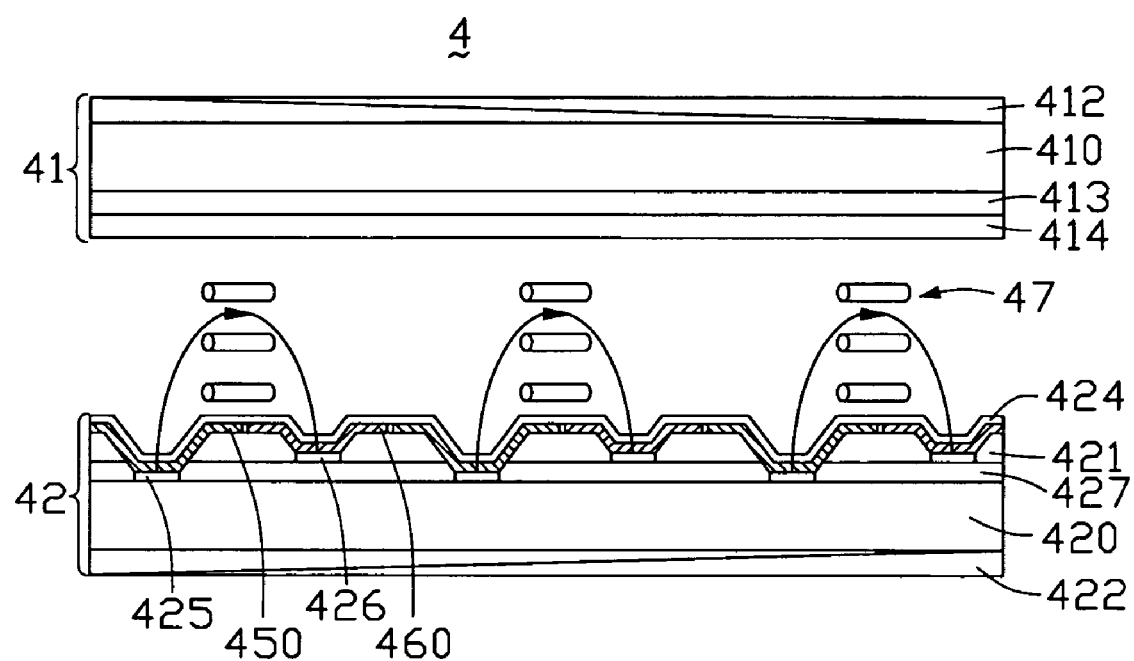
FIG. 3 is a schematic, side cross-sectional view of part of an IPS LCD according to a third preferred embodiment of the present invention, showing the IPS LCD in an operational state in which a voltage is applied.
Figure 4:
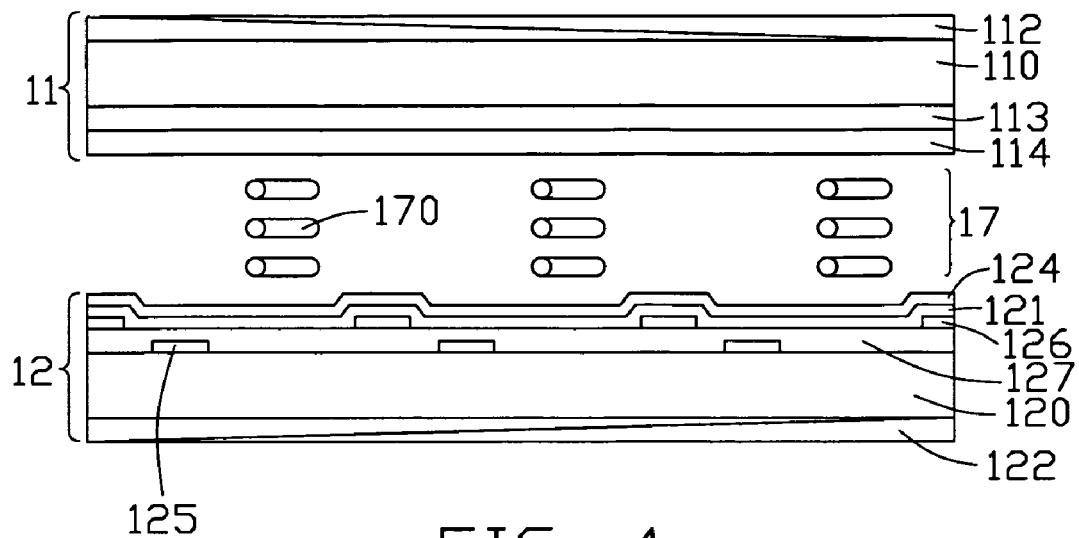
FIG. 4 is a schematic, side cross-sectional view of part of a conventional IPS LCD, showing the IPS LCD in an operational state in which no voltage is applied.
Figure 5:
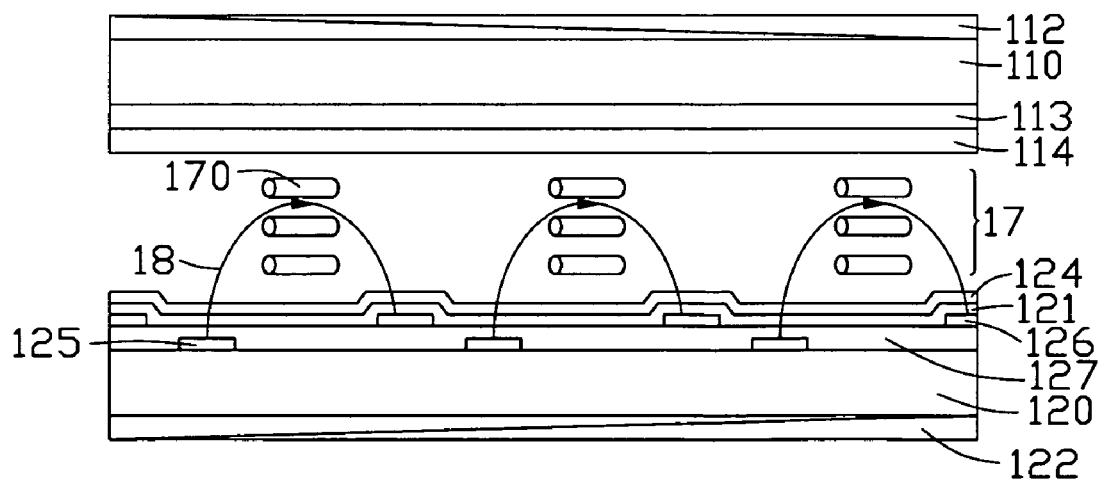
FIG. 5 is similar to FIG. 4, but showing the IPS LCD in an operational state in which a voltage is applied.

Referring to FIG. 3, an IPS LCD 4 according to a third preferred embodiment of the present invention includes a first substrate 41, a second substrate 42 opposite to the first substrate 41, and a liquid crystal layer 47 interposed between the first and second substrates 41, 42. The first substrate 41 includes a first polarizer 412, a first glass layer 410, a color filter 413, and a first alignment layer 414 arranged in that order from top to bottom.

The second substrate 42 includes a second glass layer 420, an insulation layer 427 arranged at an inner side of the second glass layer 420, a second polarizer 422 arranged at an outer side of the second glass layer 420, a plurality of common electrodes 425 formed on the second glass layer 420, a plurality of pixel electrodes 426 formed on the insulation layer 427, a passivation layer 421 arranged on portions of the insulation layer 427 surrounding the pixel electrodes 426, a first transparent conductive film 450 directly deposited on each of the common electrodes 425 and surrounding portions of the insulation layer 427 and passivation layer 421, and a second transparent conductive film 460 directly deposited on each of the pixel electrodes 426 and surrounding portions of the passivation layer 421. The insulation layer 427 is positioned between the common electrodes 425. The passivation layer 421 is positioned generally between the pixel electrodes 426. The common electrodes 425 and the pixel electrodes 426 are formed at regular, staggered intervals. A thickness of the first transparent conductive film 450 is the same as that of the second transparent conductive film 460.

For reasons similar to those described above in relation to the IPS LCD 2, a distance separating the common electrodes 425 and the liquid crystal layer 47 is equal to a distance separating the pixel electrodes 426 and the liquid crystal layer 47. Therefore, when there are charged particles in the liquid crystal layer 47, the common electrodes 425 exert a force on the charged particles which is the same as a force exerted on the charged particles by the pixel electrodes 426. Further, because polarities of the common electrodes 425 and the pixel electrodes 426 are always changed during the course of driving the IPS LCD 4, the charged particles do not concentrate at either the common electrodes 425 or the pixel electrodes 426. That is, the IPS LCD 4 can avoid image delay occurring.

As stated above, the first transparent conductive film 450 is deposited directly on the common electrodes 425 and surrounding portions of the insulation layer 427 and passivation layer 421, and the second transparent conductive film 460 is deposited directly on the pixel electrodes 426 and surrounding portions of the passivation layer 421. When a voltage is applied, an electric field produced by the first and second conductive films 450, 460 is the same as the electric field produced by the common and pixel electrodes 425, 426. Further, because an area of the first transparent conductive film 450 is larger than that of the common electrodes 425, and an area of the second transparent conductive film 460 is larger than that of the pixel electrodes 426, the electric field applied to the liquid crystal layer 47 is increased. Therefore, the liquid crystal display 4 has a better image display than the above-described conventional IPS LCD 1.

In an alternative embodiment, an IPS LCD can be similar to the above-described IPS LCD 4. The only difference is that in the alternative IPS LCD, the common electrodes 425 are instead pixel electrodes, and the pixel electrodes 426 are instead common electrodes.

In various configurations of the above-described embodiments, any one or more of the first transparent conductive films 250, 350, 450 and the second transparent conductive films 260, 360, 460 may be made of indium tin oxide (ITO) or indium zinc oxide (IZO). The insulation layer 227, 327, 427 may be made of silicon oxide or silicon nitride. In various alternative embodiments, the common electrodes 225, 325, 425 may be respectively arranged obliquely relative to the pixel electrodes 226, 326, 426.

As described above, in the IPS LCD 2, 3, 4, when there are charged particles in the liquid crystal layer 27, 37, 47, the common electrodes 225, 325, 425 exert a force on the charged particles which is the same as a force exerted on the charged particles by the pixel electrodes 226, 326, 426. Therefore, the IPS LCD 2, 3, 4 can avoid the occurrence of image delay. The display efficacy of the IPS LCD 2, 3, 4 is correspondingly superior to that of conventional IPS LCDs.

It is to be understood, however, that even though numerous characteristics and advantages of various embodiments have been set forth in the foregoing description, together with details of the structures and functions of the embodiments, the disclosure is illustrative only, and changes may be made in detail to the full extent indicated by the broad general meaning of the terms in which the appended claims are expressed.

What is claimed is:

1. A liquid crystal display, comprising:
   a first glass layer and a second glass layer opposite to each other;
   a liquid crystal layer interposed between the first and second glass layers;
   at least one alignment layer disposed between the first and second glass layers;
   a plurality of common electrodes arranged on the second glass layer;
   an insulation layer arranged on the second glass layer;
   a plurality of pixel electrodes arranged on the insulation layer;
   a first transparent conductive film arranged on each of the common electrodes; and
   a second transparent conductive film arranged on each of the pixel electrodes; wherein a distance separating the common electrodes and the liquid crystal layer is equal to a distance separating the pixel electrodes and the liquid crystal layer.

2. The liquid crystal display as recited in claim 1, wherein the insulation layer isolates the common electrodes from the pixel electrodes, and the insulation layer is positioned between the common electrodes.

3. The liquid crystal display as recited in claim 1, wherein the first transparent conductive film has a same thickness as that of the second transparent conductive film.

4. The liquid crystal display as recited in claim 1, further comprising a passivation layer arranged on portions of the insulation layer.

5. The liquid crystal display as recited in claim 4, wherein the passivation layer is positioned generally between the pixel electrodes.

6. The liquid crystal display as recited in claim 1, wherein the first and second transparent conductive films are made of indium tin oxide or indium zinc oxide.

7. A liquid crystal display, comprising:
a first glass layer and a second glass layer opposite to each other;
a liquid crystal layer interposed between the first and second glass layers;
at least one alignment layer disposed between the first and second glass layers;
a plurality of pixel electrodes arranged on the second glass layer;
an insulation layer arranged on the second glass layer;
a plurality of common electrodes arranged on the insulation layer;
a first transparent conductive film arranged on each of the common electrodes; and
a second transparent conductive film arranged on each of the pixel electrodes; wherein
a distance separating the common electrodes and the liquid crystal layer is equal to a distance separating the pixel electrodes and the liquid crystal layer.

8. The liquid crystal display as recited in claim 7, wherein the insulation layer isolates the common electrodes from the pixel electrodes, and the insulation layer is positioned between the pixel electrodes.

9. The liquid crystal display as recited in claim 7, wherein the first transparent conductive film has a same thickness as that of the second transparent conductive film.

10. The liquid crystal display as recited in claim 7, further comprising a passivation layer arranged on portions of the insulation layer.

11. The liquid crystal display as recited in claim 10, wherein the passivation layer is positioned generally between the common electrodes.

12. The liquid crystal display as recited in claim 7, wherein the first and second transparent conductive films are made of indium tin oxide or indium zinc oxide.

13. A liquid crystal display, comprising:
a first substrate comprising a first glass layer, and a first alignment layer;
a second substrate opposite to the first substrate, the second substrate comprising:
a second glass layer, common electrodes ranged on the second glass layer, an insulation layer arranged on the second glass layer, pixel electrodes arranged on the insulation layer, a passivation layer formed on portions of the insulation layer surrounding the pixel electrodes, a first transparent conductive film arranged on each of the common electrodes and surrounding portions of the insulation layer and/or the passivation layer, and a second transparent conductive film arranged on each of the pixel electrodes and surrounding portions of the passivation layer; and
a liquid crystal layer disposed between the two substrates; wherein
a distance separating the common electrodes and the liquid crystal layer is equal to a distance separating the pixel electrodes and the liquid crystal layer.

14. The liquid crystal display as recited in claim 13, wherein the insulation layer is positioned between the common electrodes, and the passivation layer is positioned generally between the pixel electrodes.

15. The liquid crystal display as recited in claim 13, wherein the first and second transparent conductive films are made of indium tin oxide or indium zinc oxide.

16. The liquid crystal display as recited in claim 13, wherein the first transparent conductive film has a same thickness as that of the second transparent conductive film.

* * * * *